United States Patent Office 3,589,924
Patented June 29, 1971

3,589,924
NON-CRYSTALLIZING, NON-FLOCCULATING
PHTHALOCYANINES
Vito Albert Giambalvo, Middlesex, and William Lee Berry, Somerville, N.J., assignors to American Cyanamid Company, Stamford, Conn.
No Drawing. Continuation-in-part of application Ser. No. 623,809, Mar. 17, 1967. This application June 23, 1970, Ser. No. 49,170
Int. Cl. C08h 17/14
U.S. Cl. 106—288Q  2 Claims

ABSTRACT OF THE DISCLOSURE

A non-flocculating, non-crystallizing phthalocyanine pigment composition is formed by a mixture of 60–95% of a crystallization, flocculation susceptible phthalocyanine pigment and about 5–40% of a sulfonated phthalimidomethyl phthalocyanine derivative represented by the formula:

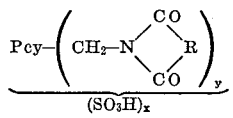

wherein Pcy is a phthalocyanine radical, R is a phenylene radical, $x$ is 0.2 to 2.5, $y$ is 0.6 to 2.1, and $x+y$ is not greater than 3.0.

CROSS REFERENCES

This application is a continuation-in-part of our application Ser. No. 623,809, filed Mar. 17, 1967, and now abandoned in favor of this application.

This invention relates to improved non-crystallizing, non-flocculating phthalocyanine pigments. More particularly, it relates to blends of non-flocculating (NF), non-crystallizing (NC) phthalocyanine pigments obtained by blending a crystallizing, flocculating red-shade phthalocyanine product with a specified proportion of a non-crystallizing non-flocculating phthalocyanine product to form a blend product which in itself is a NC-, NF-phthalocyanine pigment.

Phthalocyanine pigments have many important technical advantages and are outstanding in many of their pigmentary properties, particularly their tinctorial properties and light-fastness qualities, which make them especially desirable pigments for use in paints, enamels, lacquers and similar coating compositions. However, when ordinary phthalocyanine pigments are used in such coating compositions, a serious disadvantage, known as "flocculation," occurs. Flocculation is coalescence of pigment particles into a loose, cluster-like structure which causes the different colored particles to separate from the paint, enamel or lacquer. This phenomenon is especially observed when such coating compositions are dried, in that there is a lack of uniformity of dispersion of the pigment present, and the dry film is characterized by a non-uniform, mottled effect, which adversely affects the gloss, smoothness and color of the coating composition.

Phthalocyanines such as copper phthalocyanine exist in two common crystalline forms, as mentioned above. Usual synthesis yields a phthalocyanine of such large particle size as to have very poor pigmentary properties. The large sized particles are usually spoken of as crude phthalocyanines regardless of purity. Particle size must be reduced to pigmentary dimensions: Usually less than about 2 microns maximum dimensions, and, preferably, with most particles, less than 0.1 micron maximum dimension.

The green-shade form is conveniently produced in pigmentary form by salt-grinding a phthalocyanine, frequently a crude and treatment with a crystallizing organic liquid. Such a product is described and claimed in U.S. Pat. 2,486,351, R. H. Wiswall, Jr., "Solvent Stable Metal Phthalocyanine Pigments and Method of Making the Same," Oct. 25, 1949.

A common technique for bringing about such size reduction is by "acid pasting" which gives the red-shade form.

A finely divided tinctorially strong red-shade form of phthalocyanine is produced when phthalocyanine is dissolved with a strong acid such as concentrated sulfuric acid, syrupy phosphoric acid, oleum, chlorosulfonic acid, and the like; and then precipitated by drowning the thus-formed solution in water or dilute acid. The acid pasted pigment has excellent tinctorial qualities as formed.

The pigment particles thus formed have large surface area per unit of weight, and exhibit certain properties common to finely subdivided materials. One of these is the tendency for crystal growth in the presence of a solvent in which the material is slightly soluble; and also reversion to the most stable crystal form. Finely divided phthalocyanine of the red-shade form thus reverts to the green-shade form, of larger crystal size so that there is both a change in shade from red to green and a loss of tinctorial strength. A large variety of organic solvents causes this transformation.

A good test for the crystallizing characteristics of a phthalocyanine pigment is to boil the phthalocyanine pigment in xylene for an hour, or heat it in toluene at 50° C. for 72 hours. The retention of tinctorial strength under these test conditions is indicative of the suitability of the pigment for uses in which the pigment is stored in contact with organic solvents such as found in paint or lacquer systems. Phthalocyanine pigments which retain their tinctorial characteristics are called crystallization-resistant, and those which lose strength are referred to as crystallization-susceptible.

It is desirable to have a solvent-stable red-shade form of phthalocyanine pigment so that a broader range of color values is obtainable, but as set forth above, such red-shade pigments have generally not been crystallization-resistant, i.e., NC.

Thus, phthalocyanine pigment products obtained by ordinary methods are usually susceptible to crystallization and flocculation. Various methods have been used in attempts to convert these pigments to non-flocculating, non-crystallizing types which do not undergo uncontrolled crystallization and flocculation, often abbreviated as NF, NC.

One such method for obtaining a flocculation-resistant material is described in U.S. Pat. 2,526,345 wherein a phthalocyanine is monosulfonated to give a sulfonic acid derivative showing flocculation-resistant properties. Though the sulfonic acid derivatives are flocculation-resistance, they may tend to crystallize.

A method for obtaining phthalocyanine pigment products having non-crystallizing, non-flocculating properties is described in U.S. Pat. 2,855,403. This method involves treatment of a phthalocyanine having phthalimidomethyl groups, which phthalocyanine may also be sulfonated, with a nitrogenous base, a typical example of which is a primary aliphatic amine such as ethylene diamine. By such treatment, a NF, NC pigment is obtained. Here also, NF, NC phthalocyanine pigments may be obtained by blending a proportion of the amine-treated NF, NC material with crystallization and flocculation-susceptible material. Such treatments, though effective, are costly and, from a commercial standpoint, not a complete solution to the problem.

In U.S. Pat. 2,891,964, there is described a method for obtaining crystallization-resistant red-shade phthalocyanine pigments by blending certain crystallization-susceptible red-shade phthalocyanine pigments, i.e., particularly by blending (1) a phthalocyanine which had been reacted with a N-hydroxy-methylphthalimide and (2) a phthalocyanine not so reacted.

It is an objected of the present invention to obtain non-crystallizing, non-flocculating phthalocyanine pigments. It is a further object of this invention to obtain such pigments in an economical manner of requiring the use of expensive aftertreatments. Other objects will become apparent from a reading of the ensuing description of this invention.

The present invention is based on the discovery that improved non-flocculating, non-crystallizing phthalocyanine pigments of desirable reddish shade blue color are obtained by blending a sulfonated phthalimidomethyl derivative of a phthalocyanine, with a phthalocyanine pigment of the conventional normal flocculating and crystallizing type prepared by the usual methods, e.g., acid pasting or salt grinding, for converting phthalocyanine materials to pigmentary size.

The sulfonated phthalimidomethyl phthalocyanines used in preparing the blends of this invention may be obtained as described in U.S. Pat. 2,761,868. These products may be represented as follows:

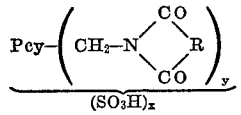

wherein Pcy represents a phthalocyanine molecule, R represents a phenylene ring which may be substituted by a substituent such as $SO_2NH_2$, $x$ is 0.2 to 2.5, $y$ is 0.6 to 2.1 and $x+y$ is not greater than 3, these figures being average values according to assay. The sulfonic acid group (or groups) may be present in the phthalocyanine radical and/or in the phthalimido radical.

The pigments included within the above formula should be understood to be mixtures containing sulfonated phthalimidomethyl phthalocyanines of the following structures:

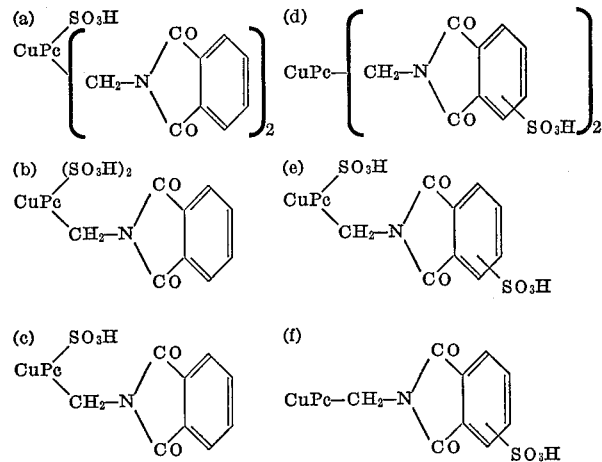

Similarly, it should be understood that the phenylene ring of the phthalimido radical may be further substituted with groups such as sulfamyl (i.e., $-SO_2NH_2$) radicals.

In the pigment compositions of this invention, from about 5 parts to about 40 parts of the sulfonated phthalimidomethyl pigment product are used for each 100 parts of blend with the flocculation- and crystallization-susceptible red-shade product. For best practical results, the lower limit of sulfonated phthalimidomethyl pigment is about 10%. No advantage results when more than about 40% of the sulfonated phthalimidomethyl product is used. In fact, there may be disadvantages, especially since the sulfonated phthalimidomethyl product is more expensive, of lower tinctorial value, and of greener shade.

The present invention may be applied to various types of phthalocyanine pigments including metal and non-metal derivatives. The most commonly used phthalocyanine product is, of course, copper phthalocyanine. Others which may be used are the nickel, aluminum, tin and manganese phthalocyanines. Halogens may be present either on the metal atoms or in the phthalocyanine moiety.

Although substituted methylolphthalimides may be used in practicing this invention, it is usually most convenient and practical to use methylolphthalimide itself for preparation of phthalimidomethyl derivatives. The methods of preparation of the sulfonated phthalimidomethyl phthalocyanines are dependent upon the use of appropriate conditions, e.g., reagent strength, time and temperature, to obtain the suitable and appropriate sulfonic acid content and number of phthalimidomethyl radicals as defined above in the converted product.

The sulfonation of the phthalocyanine and condensation with methylolphthalimide may be carried out concurrently or stepwise. The condensation with the methylol group takes place more rapidly than the sulfonation of the phthalocyanine, and, thus, as stated, the reaction should be controlled by the balance of the four variables: time, temperature and concentrations of acid and methylolphthalimide, to give the desired sulfonated product. Thus, the reaction can be completed within about 1.5–5 hours at temperatures in the range of about 80–100° C. using oleum with a 0.5 to 5% $SO_3$ concentration and 1–3 moles of methylolphthalimide for each mole of copper phthalocyanine.

In the preparation of the blends of this invention, various methods may be used. Thus, the blending may be carried out simply by mixing the two products together, either as dry powders or wet pastes. Alternatively, a wet blending process may be used whereby a reaction mixture containing the sulfonated phthalimidomethyl product is drowned and the resulting composition is treated with a sulfuric acid solution of the crude flocculation and crystallization-susceptible copper phthalocyanine in the above-stated proportions. The resulting compositions are then worked up by simple filtration and washing with water. The products of the present invention are of superior quality since they are both non-crystallizing and non-flocculating. It is surprising that a non-flocculating non-crystallizing product with superior properties could be obtained by blending flocculation- and crystallization-susceptible materials with relatively small amounts of these products.

The invention is further illustrated by the examples which follow.

EXAMPLE 1

To 890 grams of 2% oleum is added, with stirring at 25 to 40° C., 56 grams of crude phthalocyanine. The mixture is heated to 92° C. at a rate of about 1° per minute and it is then held at around 90 to 95° C. for about 1½ hours. After cooling to 80° C., 56 grams of methylolphthalimide is added at 80 to 85°. The mixture is then stirred at about 83 to 87° C. for 2½ hours. After adding 285 grams of xylene sulfonic acid, the mixture is cooled, with stirring, to about 35° C. and then drowned with good stirring into about 6,000 grams of ice slush. Into the whole is then added 5 grams of surface active agent (50% Arquad 12) and the mixture is then heated at 90 to 100° C. for one hour. After filtering out, the solid material is washed with water and then dried at 60 to 75° C., giving 93 grams of sulfonated phthalimidomethyl copper phthalocyanine averaging 0.6 sulfonic acid groups and 1.3 phthalimidomethyl groups.

The oleum strength can be varied from about 1.6% to 3.2% sulfur trioxide content. The 2% oleum used above was prepared by mixing 99+% $H_2SO_4$ and 7% oleum to give 100.5% $H_2SO_4$.

Similar results are obtained by sulfonating for three hours at 81° to 85°.

EXAMPLE 2

By varying the conditions of sulfonation and reaction with methylolphthalimide, sulfonated phthalimidomethyl copper phthalocyanines were prepared having varying proportions of sulfonic acid and phthalimidomethyl radicals present.

Products with specified sulfonic acid and phthalimidomethyl radicals present, as designated in the Tables I and II below, were blended with a conventional red-shade copper phthalocyanine susceptible to crystallization and flocculation using one part of the sulfonated material with phthalimidomethyl radicals present to 5 parts of the conventional red-shade copper phthalocyanine. The blends contained 83% conventional material and 17% of the sulfonated phthalimidomethyl product.

The resulting pigment products were used in a flocculation test by making enamel formulations and determining the degree of flocculation; and recrystallization tests by noting the growth in crystal size upon exposure for 72 hours to toluene (a crystallizing liquid) at 50° C. In the following tables are shown the results on products with varying sulfonic acid ($x$) and phthalimidomethyl radical ($y$) content. Table I shows the results for blends which have satisfactory flocculation- and crystallization-resistance, Class $a$ designating non-flocculating, non-crystallizing properties. Table II shows results where the flocculation and crystallization properties were unsatisfactory, Class $b$ designating pigments which are non-flocculating only and Class $c$ designating pigments which are neither non-flocculating, nor non-crystallizing.

TABLE I

| | $y$ | $x$ | $x+y$ | Flocculation (enamels) | Crystallization (toluene 50° C., 72 hrs.) |
|---|---|---|---|---|---|
| Class: | | | | | |
| a | 1.3 | 0.6 | 1.9 | Trace | None. |
| a | 0.6 | 0.6 | 1.2 | do | Do. |
| a | 0.6 | 2.4 | 3.0 | Slight | Do. |
| a | 2.1 | 0.21 | 2.3 | Moderate | Do. |

TABLE II

| | $y$ | $x$ | $x+y$ | Flocculation (enamels) | Percent crystallization (toluene 50° C., 72 hrs.) |
|---|---|---|---|---|---|
| Class: | | | | | |
| b | 2.5 | 0.53 | 3.0 | Trace | >90 |
| b | 4.0 | 0.96 | 5.0 | Slight | >90 |
| b | 4.3 | 0.1 | 4.4 | Moderate | >90 |
| c | 4.3 | 1.11 | 5.4 | Considerable | >90 |
| c | 1.6 | 1.49 | 3.1 | Much | >90 |
| c | 5.3 | 1.1 | 6.4 | do | >90 |
| c | 1.7 | 1.6 | 3.3 | do | >90 |
| c | 2.0 | 2.2 | 4.4 | do | >90 |
| c | 2.5 | 3.5 | 6.0 | do | >90 |

From these results, it can be seen that pigment blends, in which either of the components deviated from this invention in respect to the values of $x$, $y$ and/or $x$ and $y$, were not satisfactory from the standpoint of combined flocculation- and crystallization-resistance.

EXAMPLE 3

Using one part of the product designated in line 2 of Table I of Example 2 as a Class $a$ product wherein Y and X are both equal to 0.6, a blend was prepared using 19 parts of a conventional red-shade copper phthalocyanine pigment susceptible to crystallization and flocculation. This blend ratio corresponds to a product having 95% of the conventional red-shade material.

Crystallization and flocculation tests on this blend showed results substantially similar to those described in Table I of Example 2.

EXAMPLE 4

Using one part of the product designated in line 4 of Table I of Example 2 as a Class $a$ product where Y is equal to 2.1 and X is equal to 0.21, a blend was prepared using 3 parts of a conventional red-shade copper phthalocyanine pigment susceptible to crystallization and flocculation. This blend ratio corresponds to a product having 75% of the conventional red-shade material.

The product is non-flocculating and non-crystallizing.

We claim:

1. A non-flocculating, non-crystallizing phthalocyanine pigment composition consisting essentially of a mixture of 60–95% of a crystallization, flocculation susceptible phthalocyanine pigment and about 5–40% of a sulfonated phthalimidomethyl phthalocyanine derivative represented by the formula:

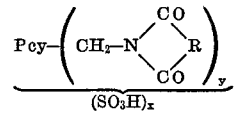

wherein Pcy is a phthalocyanine radical, R is a phenylene radical, $x$ is 0.2 to 2.5, $y$ is 0.6 to 2.1, and $x+y$ is not greater than 3.0.

2. A non-flocculating, non-crystallizing phthalocyanine pigment composition according to claim 1 wherein the sulfonated phthalimidomethyl phthalocyanine derivative is derived from a copper containing phthalocyanine pigment.

References Cited

UNITED STATES PATENTS

| 2,526,345 | 10/1950 | Giambalvo | 106—288Q |
| 2,867,539 | 1/1959 | Brovillard et al. | 106—288Q |
| 2,891,964 | 6/1959 | Roberts | 106—288Q |

JAMES E. POER, Primary Examiner